United States Patent
Beerhalter et al.

(10) Patent No.: US 7,153,078 B2
(45) Date of Patent: Dec. 26, 2006

(54) LOADING AND UNLOADING STATION AND METHOD FOR LOAD CARRIER OF VEHICLE BODIES, VEHICLES AND THE LIKE

(75) Inventors: Christoph Beerhalter, Lorch (DE); Lothar Boettcher, Leipzig (DE); Guenther Wolf, Bietigheim (DE); Guenther Wittenmayer, Hemmingen (DE); Claus-Peter Krause, Fellbach (DE); Eckard Uebach, Freudenberg-Heisberg (DE); Ernst Hopf, Trostberg (DE); Walter Kramer, Meckenheim (DE)

(73) Assignees: Dr. Ing. h.c.F. Porsche Aktiengesellschaft, Stuttgart (DE); UTC Uebach Technologie Consulting GmbH, Niederfischbach (DE)

( * ) Notice: Subject to any disclaimer, the term of this patent is extended or adjusted under 35 U.S.C. 154(b) by 337 days.

(21) Appl. No.: 10/439,306

(22) Filed: May 16, 2003

(65) Prior Publication Data

US 2004/0052621 A1    Mar. 18, 2004

(30) Foreign Application Priority Data

May 16, 2002    (DE) .............................. 102 21 733

(51) Int. Cl.
*B65G 67/02*    (2006.01)
(52) U.S. Cl. ........................ 414/400; 410/43; 414/373; 414/392

(58) Field of Classification Search .................. 410/26, 410/43; 406/335; 414/373, 392, 400
See application file for complete search history.

(56) References Cited

U.S. PATENT DOCUMENTS

| 1,499,530 | A | * | 7/1924 | Henderson | .................. 414/498 |
| 1,750,129 | A | * | 3/1930 | Romine | ......................... 280/1 |
| 1,750,130 | A | * | 3/1930 | Romine | ...................... 29/430 |
| 1,772,735 | A | * | 8/1930 | Romine | ...................... 29/430 |

(Continued)

FOREIGN PATENT DOCUMENTS

| DE | 616484 C2 | 11/1987 |
| DE | 4441464 A1 | 5/1996 |
| DE | 19620909 A1 | 4/1997 |
| DE | 19641048 A1 | 4/1998 |

(Continued)

OTHER PUBLICATIONS

European Search Report dated Nov. 7, 2005.

*Primary Examiner*—Thomas J. Brahan
(74) *Attorney, Agent, or Firm*—Crowell & Moring LLP

(57) ABSTRACT

Through a loading and unloading station for load carriers of vehicle bodies, vehicles or the like, it is possible to unload vehicle bodies from a railway car in a continuous cycle and supply them to a production facility, wherein in one cycle simultaneously the load carriers receiving the vehicle bodies are returned to an empty railway car.

14 Claims, 2 Drawing Sheets

U.S. PATENT DOCUMENTS

| | | | |
|---|---|---|---|
| 2,896,548 A * | 7/1959 | Obes | 104/48 |
| 3,212,654 A * | 10/1965 | Dolphin | 414/341 |
| 4,773,807 A * | 9/1988 | Kroll et al. | 414/282 |
| 4,776,085 A * | 10/1988 | Shiiba | 29/824 |
| 5,013,203 A * | 5/1991 | Wakabayashi | 198/465.3 |
| 5,513,428 A * | 5/1996 | Shiramizu et al. | 29/712 |
| 5,577,597 A * | 11/1996 | Kakida et al. | 198/465.1 |
| 5,890,855 A * | 4/1999 | Claps | 410/26 |
| 6,494,304 B1 * | 12/2002 | Jaynes et al. | 198/345.2 |
| 6,550,227 B1 * | 4/2003 | Panzarella et al. | 53/485 |
| 6,619,907 B1 * | 9/2003 | Pajot | 414/795.2 |
| 6,688,674 B1 * | 2/2004 | Sato et al. | 296/185.1 |
| 6,726,438 B1 * | 4/2004 | Chernoff et al. | 414/802 |
| 6,915,571 B1 * | 7/2005 | Hosono et al. | 29/897.2 |

FOREIGN PATENT DOCUMENTS

| | | |
|---|---|---|
| DE | 19852236 A1 | 5/2000 |
| EP | 0667273 | 8/1995 |
| GB | 998365 | 7/1965 |
| GB | 2295381 A * | 5/1996 |
| WO | WO 81/01997 | 7/1981 |

* cited by examiner

LOADING AND UNLOADING STATION AND METHOD FOR LOAD CARRIER OF VEHICLE BODIES, VEHICLES AND THE LIKE

BACKGROUND AND SUMMARY OF THE INVENTION

This application claims the priority of German Application No. 102 21 733.5 filed May 16, 2002, the disclosure of which is expressly incorporated by reference herein.

The invention relates to a loading and unloading station for load carriers of vehicle bodies, vehicles and the like which can be transported in a railway car and supplied from there in several successive workstations to a production facility.

Loading and unloading stations for goods that need to be removed from means of transport are usually associated with the problems that on one hand goods cannot be supplied continuously to a destination and on the other hand a prop rack or the like that holds the goods cannot be reintroduced into a cycle back to the means of transport and that, therefore, the goods that are to be transported and the empty transport racks cannot be guaranteed to pass through promptly.

It is an object of the invention to create a loading and unloading station for vehicle bodies or vehicles which allows in a simple manner to supply vehicle bodies or vehicles continuously to an assembly line or the like and consequently ensure the removal of empty carriers for the bodies or vehicles.

This object is achieved pursuant to the invention by providing a loading and unloading station for load carriers of vehicle bodies, vehicles or the like, which can be transported in a railway car and supplied from there in several successive workstations to a production facility, wherein load units containing vehicle bodies can be conveyed from the railway car to a production facility after passing through a plurality of workstations; and wherein the vehicle bodies can be unloaded and subsequently the empty load units or load carriers are returned in a cycle to the railway car via further workstations.

Important benefits achieved with the invention largely consist of the fact that in successive workstations from unloading vehicle bodies or vehicles from a railway car to feeding the vehicle bodies or vehicles to an assembly line or the like and the removal and reloading of several load carriers for vehicle bodies or vehicles into the unloaded railway cars a continuous, coordinated unloading process for the bodies or vehicles and a simultaneous loading process of the empty body carriers into the railway cars is guaranteed.

This is achieved in particular preferred embodiments of the invention by unloading a load unit with two vehicle bodies that are aligned on load carriers in the longitudinal direction of the railway car by means of a loading and unloading system of a loading cart that can be displaced parallel to the railway car in the direction of the arrow. The load carrier is then transported on a rotary table, which is arranged parallel to the loading cart and can be displaced transversely thereto. The longitudinally aligned load unit can be fed from there to a chain conveying device that is arranged transversely thereto. Said device then separates the load unit into load carriers that are arranged behind one another by means of a destacking device, removes the vehicle body and places it onto a rack by means of a device and then supplies it to a removal device of the production facility. This process for feeding the vehicle bodies to the production facility or the like and removing the load carrier takes place automatically, and the processes in the work stations are coordinated such that unloading can be followed by a loading process.

All processes are controlled accordingly by a control system in particular preferred embodiments of the invention so that the sequences for taking over the load carriers can be coordinated with each other in the individual workstations and a continuous flow of the vehicle bodies to the production facility and the like can take place.

Passing of nine individual successive workstations of the loading and unloading stations in particular preferred embodiments of the invention beneficially occurs pursuant to the invention such that in the first workstation the load unit is unloaded through the loading cart by means of an integrated lifting and transport device. In the second workstation, the load unit can be supplied via chain conveyors of the loading cart to a moving rotary table with a chain conveyor, from which the load unit is forwarded in the third workstation via the chain conveyors to another chain conveyor, which is offset by 90°, of a transport belt. In the fourth workstation, the load unit is separated into the individual load carriers by the portal lifting device, which is designed as a stacking device. After that, in the fifth workstation, the vehicle bodies are lifted off the load carrier, respectively, and they are combined in a stacking device, resting on top of each other, into a four-unit stack in the cycle of the next workstation. In the seventh workstation they can be fed to a stationary rotary table. In the eighth workstation the four-unit stack can be placed from the rotary table onto the loading cart and can be moved from there into an empty railway car in the ninth workstation.

After the load carrier or the load unit passes at least five workstations, the vehicle body can be supplied to a production facility or the like. Subsequent to these workstations, the empty load carrier can then be transported further and returns to the railway car, from which the vehicle bodies have been removed, after at least four additional workstations. This successive passing of the workstations enables a rapid sequence of continuously supplying vehicle bodies and removing empty load carriers into the railway car.

Based on the invented use of so-called rotary tables, a simplified, exact repositioning of the load unit with the vehicle bodies from a transverse direction into a longitudinal direction and vice versa is possible. For this purpose, the loading cart can be displaced on tracks parallel to the railway car, and on one hand in a first working position in accordance with a transfer position for the load unit and on the other hand in the eighth working position in accordance with another transfer position it is possible to move a four-unit stack from a stationary, pivoting rotary table in a cycle back into the first transfer position for storing the four-unit stack in an empty railway car. The rotary tables are each equipped with so-called chain conveyors so that it is possible to transfer the load unit or the load carrier to the forwarding chain conveyors of the device in a simple manner.

To facilitate loading and unloading of the railway car into the loading cart or from the loading cart in particular preferred embodiments of the invention, it contains two spaced lifting forks between which chain conveyors for the load unit or for the bottom load carrier are arranged. In the first working position, the lifting forks engage front seats of the transverse carriers from beneath for transport and lifting purposes. In the first workstation, the load unit in particular can be placed onto the chain conveyors of the loading cart, and in the second working position it can be displaced on the rotary table, which is arranged parallel and aligned with the loading cart, onto the subsequent chain conveyors of the rotary table. The rotary table can be displaced especially at a right angle to the longitudinal axis of the loading cart, wherein the load unit can be rotated about a right angle through a rotary rack of the rotary table such that the vehicle bodies placed on top point with their front vehicle ends opposite the moving direction of the rotary table. Rotation of the load unit with the vehicle bodies is necessary to be able to feed them to the assembly line in the desired alignment.

A transport section on chain conveyors, which connects to the load unit at a right angle and on which the load unit can be displaced by the rotary table autonomously, is provided for conveying the load unit away from the rotary table in particular preferred embodiments of the invention.

To be able to separate the load carriers that are arranged on top of each other, a so-called portal stacking device is equipped for example with telescoping as well as lifting and lowering forks, which separate the load unit into load carriers in the fourth working position in particular preferred embodiments of the invention.

For this the upper load carrier is initially lifted, and the exposed lower load carrier is forwarded in particular preferred embodiments of the invention. The upper load carrier is subsequently lowered, and the vehicle body is placed onto a receiving rack. The load carriers have now been easily separated so that the vehicle bodies can be removed and be placed onto a rack, from where they are forwarded by a device.

The load carriers, which are released now, are rolled onto a transport section, which runs parallel to the loading cart. In the sixth workstation the load carriers are fed to a stacking device, which performs a stacking process by means of a lifting device of four load carriers into a four-unit stack in such a manner that the respectively lowest load carrier can be lifted and the remaining load carriers can be moved underneath. The individual load carriers contain upwardly protruding stanchions and/or props on each side, which support the uppermost load carrier of a load unit when being stacked on top of each other. Before stacking the load carriers into a four-unit stack, these upwardly protruding stanchions and/or props are retracted beforehand by means of a device.

The four-unit stack, which is arranged parallel to the loading cart, is transferred from the turned rotary table into the loading cart, wherein in the eighth working station the four-unit stack can be lifted by the loading and unloading device of the loading cart and can be placed into the railway car from which the load unit has been removed by the chain conveyors in the ninth working position.

The empty railway car is then supplied successively with the load units consisting of a four-unit stack so that hereby the cycle from removing the vehicle bodies onto the load carriers to loading the load units is completed.

A loading and unloading station for vehicles bodies or vehicles is shown in a diagrammatic view in the drawings, including the sequence of the workstations.

Other objects, advantages and novel features of the present invention will become apparent from the following detailed description of the invention when considered in conjunction with the accompanying drawings.

DETAILED DESCRIPTION OF THE DRAWINGS

Figure 1:
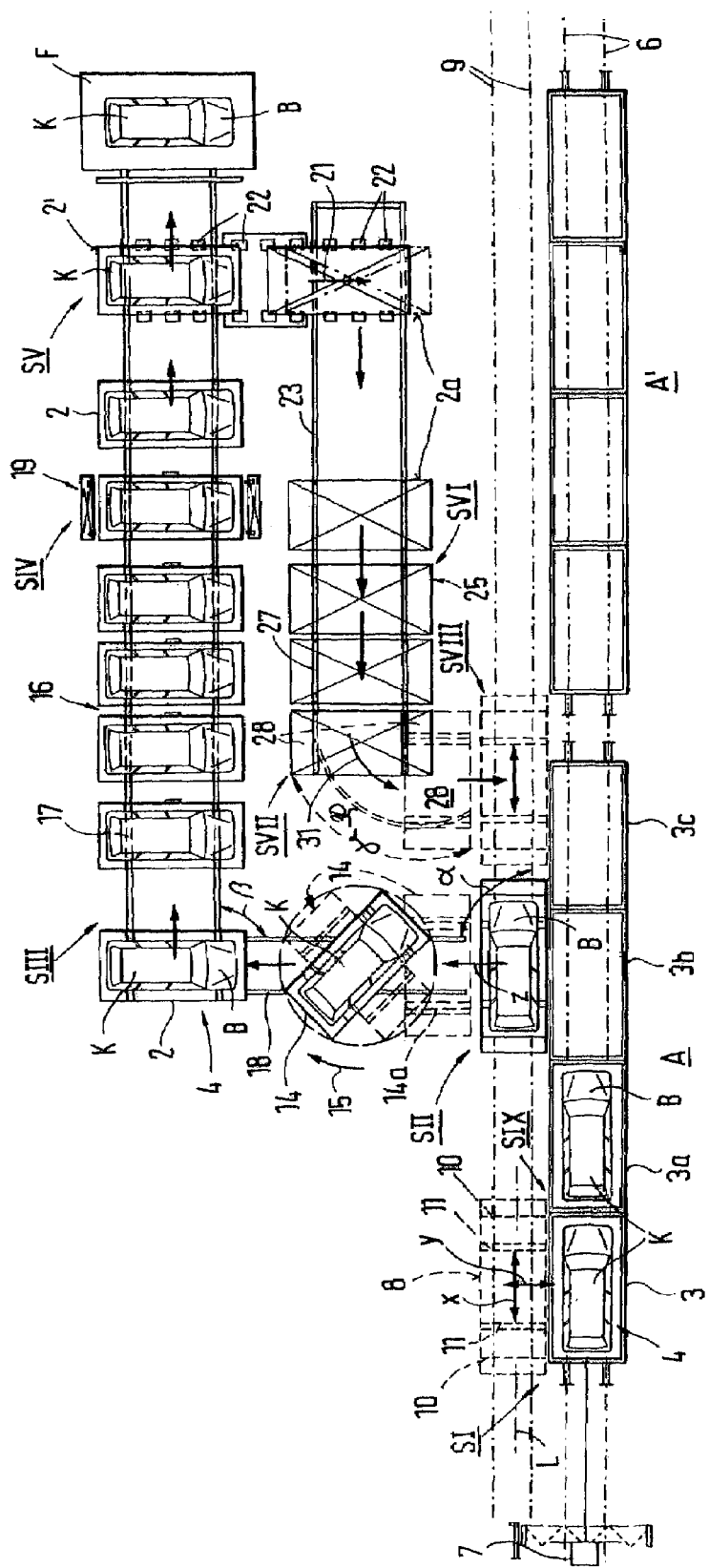
FIG. 1 is a diagrammatic representation of a sequence schedule of an loading and unloading station constructed according to a preferred embodiment of the invention.

A loading and unloading station 1 pursuant to the drawing in FIG. 1 comprises several so-called workstations S I through S IX, which forward the vehicle bodies K as prefabricated vehicles on load carriers 2 from a railway car 3 to conveying systems and in this cycle load empty load carriers 2a back into the railway car 3.

The vehicle bodies K or the prefabricated vehicles are held in the load carriers 2, of which two when placed on top of each other create a load unit 4 and which are transported in the railway cars 3. It is standard that the load units 4 or the individual load carriers 2 face all in one direction.

The two railway car units A and A' depicted in the drawing are loaded with the load units 4. Unloading occurs alternately with loading of the empty load carriers 2 as so-called four-unit stacks V, wherein the car unit A' is not loaded with empty load carriers 2 so as to allow all cars 3 to be able to be loaded with load units 4 in a new loading process by means of the returned load carriers 2.

Unloading of the railway cars occurs automatically with electrical controls and signals in such a way that the railway cars 3 are moved across the tracks 6 for example into a hall or are pulled via a winch 7 into the hall and are positioned accordingly for unloading of the load units 4. The doors of the cars 3 are opened manually, and an operator actuates the automatic unloading process.

A loading cart 8 is guided parallel to the track 6 of the railway car 3 also on tracks 9, wherein said cart assumes automatically an appropriate workstation S I for unloading of the load units 4 from the first car 3 and subsequently unloads the remaining cars 3a, 3b, 3c, etc.

The loading cart 8 comprises a device 10 with telescoping and retractable lifting forks, between which chain conveyors 11 are arranged. These lifting forks reach beneath the lower load carrier 2 on both fronts 12 by engaging recesses 13 on the front. The load unit 4, consisting of the two stacked load carriers 2, 2', is lifted slightly vertically by means of the lifting forks and is placed onto the platform of the loading cart 8 on the chain conveyors 11 by retracting the corresponding lifting forks 10. After that the loading cart 8 moves on the tracks 9 into the workstation S II, where the loading cart 8 then faces a displaceable rotary table 14, which is guided at a right angle α to the tracks 9 of the loading cart 8. The load unit 4 with the two stacked load carriers 2, 2' is forwarded via the chain conveyors 11 onto the next chain conveyor 14a of the rotary table 14. In this workstation S II the rotary table 14 is aligned parallel to the tracks 9.

To allow the vehicle bodies K to assume a predetermined direction, in which the vehicle front B points in the direction of the railway car 3 etc., the rotary table 14 performs a rotation of the load unit 4 by 90° in the direction of the arrow 15. The rotary table moves on a guideway 18 into the workstation S III, where the rotary table 14 is opposite a transport belt 16 with chain conveyors 17. This belt 16 runs at a right angle β to the guideway 18 and parallel to the tracks 6 and 9.

The load unit 4 is then automatically forwarded to the chain conveyors 17 of the transport belt 16 from the chain conveyors 14*a* of the rotary table 14. In the workstation S IV the load units 4 are supplied to a so-called destacking device 19, in which the load units 4 are separated into the two load carriers 2, 2'.

Figure 2:
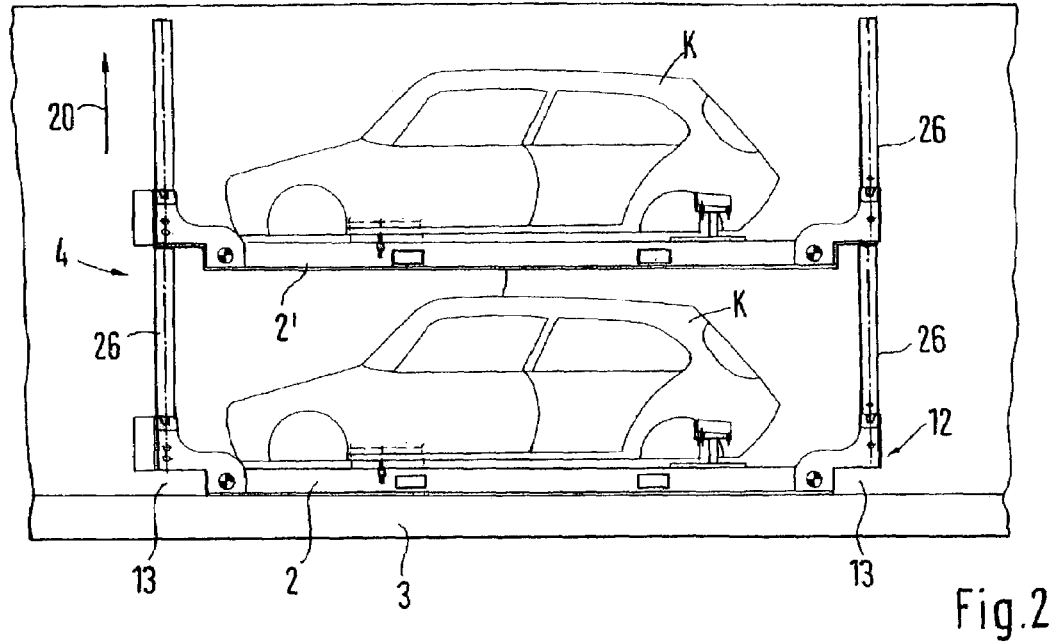
FIG. 2 is a view onto a load unit consisting of two load carriers with vehicle bodies placed on top constructed according to a preferred embodiment of the invention.

The destacking device 19 lifts the upper load carrier 2' with forks or similar devices in the direction of the arrow 20, which is shown in FIG. 2, so that the bottom load carrier 2 is released and can be removed. After that the upper load carrier 2' is lowered onto the chain conveyors 17 so that the load carriers 2, 2' are arranged behind one another on the chain conveyors in a joint plane, as FIG. 1 also shows more closely. The vehicle bodies K are then removed successively from the load carriers 2, 2' and supplied to an assembly line F or the like or an assembly facility. The empty load carriers 2*a* etc., are forwarded in a cycle crosswise to the transport belt 16 in the direction of the arrow 21 for example by means of additional chain conveyors or rollers 22 onto a transport belt with chain conveyors 23. Said transport belt in turn is arranged parallel to the tracks 9 of the loading cart 8 so that easy loading onto the loading cart 8 can occur.

Figure 3:
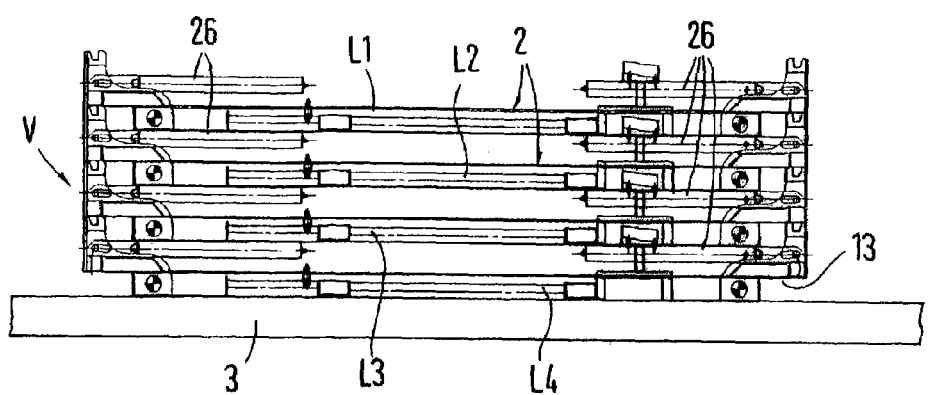
FIG. 3 is a view onto a four-unit stack consisting of four load carriers that have been arranged on top of each other with retracted stanchions constructed according to a preferred embodiment of the invention.

Before loading, the load carriers 2, 2' are combined in a stacking device 25 into a so-called four-unit stack V pursuant to FIG. 3. The load carriers 2 etc. are all arranged on top of each other. Before they reach the stacking device 25, the upwardly protruding stanchions 26 of the load carriers 2 are automatically retracted in a device.

In the stacking device 25, initially the first empty load carrier L1, as documented in FIG. 3 with the reference numbers L1 through L4, is lifted, then the second load carrier L2 is moved underneath and both load carriers L1 and L2 are lifted. Subsequently the third load carrier L3 is moved under L1 and L2 and then L1, L2 and L3 are lifted, L4 is then moved under L1, L2 and L3 and all four load carriers L1, L2, L3 and L4 are placed onto a subsequent rotary table 28 as a so-called four-unit stack V by means of chain conveyors 27.

This rotary table 28 can pivot about a swivel axis 29 and can swivel automatically by an angle δ of 90° parallel to the loading cart 8 in the direction of the arrow 31 after receiving the four-unit stack V. Rollers or the like, which run on a guideway that is designed for example as a steel rail 30, support the rotary table 28 towards the contact surface.

The four-unit stack V, consisting of four load carriers L1, L2, L3 and L4 that have been stacked on top of each other, is received by the device 10 through the loading and unloading device 10 of the loading cart 8 and is loaded from there into the empty car 3 etc.

The loading cart 8 is equipped with an automatic positioning system, which allows the exact receiving position for the load unit 4 to be recognized so as to then control the transport actions. For this in particular markings and reference points are provided on the railway car 3 etc. and on the load carriers 2, 2' or on the load units 4 as well as on the transfer positions or the individual workstations S I through S IX. The individual processes from unloading to feeding the vehicle body K to the production facility F and the return transport of the load carriers 2, 2' into the railway car 3 are coordinated with each other by means of module controls such that a continuous cycle for loading and unloading is created.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Loading and unloading station between a production facility and at least one railway car, comprising
    a plurality of workstations,
    a plurality of load units arranged to move in a path successively to each of the workstations,
    a plurality of load carriers, each of the load carriers is configured to support a vehicle body and to be unloaded at a first of the workstations from the at least one railway car on one of the load units, wherein each of the load units is sized and configured to carry at least two of the load carriers one above the other and to be supplied to the production facility from the at least one railway car in which the respective load carrier and vehicle bodies are arranged in a longitudinal direction of the at least one railway car,
    a plurality of loading carts arranged to be moved in the longitudinal direction,
    means for unloading a load unit from the at least one railway car in a direction transverse to the at least one railway car onto one of the loading carts and to move the loaded loading cart in the longitudinal direction to a second of the workstations at which a rotary table is adjacent to the loaded loading cart,
    means for moving the load unit carrying the vehicle bodies from the loaded loading cart onto the rotary table, turning the load unit in a direction transverse to the longitudinal direction and moving the load unit to a third of the workstations at which a transport device is located and arranged to move the load unit in the longitudinal direction,
    a fourth of the workstations comprising a destacking device to which the load unit is moved and configured to separate the load carriers on the load unit onto individual load carriers so as to be arranged one behind the other in the longitudinal direction,
    a fifth of the workstations comprising means for moving each of the vehicle bodies successively from its associated load carrier to the production facility and thereafter moving each load carrier from which the associated vehicle body has been moved in a direction transverse to the longitudinal direction to a sixth of the workstations comprising a conveyor arranged to transport the empty individual load carriers in the longitudinal direction,
    a seventh of the workstations configured to lift the empty individual load carriers and to place them one over the other to form a stack of at least four units and to rotate the stack into a position aligned with the longitudinal direction, and
    means for moving the stack to an eighth of the workstations at which the stack is moved onto a loading cart for being loaded into an empty railway car.

2. Loading and unloading station pursuant to claim 1, wherein the loading cart is configured to be displaceable on tracks parallel to the railway car, and, on one hand in the first workstation in accordance with a first transfer position for the load unit and on the other hand in the workstation in accordance with another transfer position a four-unit stack is movable from a stationary, pivoting rotary table in the path back into a ninth workstation adjacent the first workstation for storing the four-unit stack in an empty railway car.

3. Loading and unloading station pursuant to claim 2, wherein the loading cart has two spaced lifting forks between which are arranged the chain conveyors for the load unit or for the bottom load carrier of the unit and in the first workstation the lifting forks are configured to reach into seats on the front of the carriers from beneath to transport and lift the load unit.

4. Loading and unloading station pursuant to claim 2, wherein a first working position is provided at which the load unit is placed onto chain conveyors of the loading cart and moved on the displaceable rotary table which is arranged parallel and aligned with the loading cart, and a second workstation is provided at which the load unit is placed onto subsequent chain conveyors of the displaceable rotary table.

5. Loading and unloading station pursuant to claim 1, wherein a loading cart has two spaced lifting forks between which are arranged the chain conveyors for the load unit or for the bottom load carrier of the unit and in the first workstation the lifting forks are configured to reach into seats on the front of the carriers from beneath to transport and lift the load unit.

6. Loading and unloading station pursuant to claim 1, wherein a first working position is provided at which the load unit is placed onto chain conveyors of the loading cart and moved on the displaceable rotary table which is arranged parallel and aligned with a loading cart, and a second workstation is provided at which the load unit is placed onto subsequent chain conveyors of the displaceable rotary table.

7. Loading and unloading station pursuant to claim 6, wherein the displaceable rotary table is arranged to be rotated at a right angle to a longitudinal axis of the loading cart, and the load unit is configured to be rotated by a rotary rack of the rotary table by an angle α of 90° such that a front region of the vehicle bodies placed on top are oriented opposite a moving direction of the rotary table.

8. Loading and unloading station pursuant to claim 7, wherein the displaceable rotary table is arranged to be rotated at a right angle to a longitudinal axis of the loading cart, and the load unit is configured to be rotated by a rotary rack of the rotary table by an angle α of 90° such that a front region of the vehicle bodies placed on top opposite a moving direction of the rotary table.

9. Loading and unloading station pursuant to claim 1, wherein chain conveyors supply the rotary table in the eighth workstation, which corresponds to a transfer position, to a transport section that connects to the load unit at a right angle, and rotary table is configured to displace the load unit autonomously at said transport section.

10. Loading and unloading station pursuant to claim 1, wherein the load unit is arranged to be supplied by the chain conveyors of the rotary table from the eighth workstation to a destacking device with lifting and lowering forks,
said destacking device being configured to separate the load unit in the fourth workstation into individual load carriers such that initially the uppermost load carrier is lifted and the exposed load carrier underneath is transported and that subsequently the upper load carrier is lowered and the vehicle body is placed onto a receiving rack.

11. Loading and unloading station pursuant to claim 1, wherein an empty load carrier having upright stanchions is arranged to be fed, via a transport section running parallel to the loading cart, to a stacking device in the sixth workstation,
wherein before said sixth workstation, the upright stanchions are arranged to be retracted individually and the stacking device to stack four load carriers into a four-unit stack with a lifting device such that the respective load carrier on the bottom can be lifted and the remaining load carriers can successively move therebeneath.

12. Loading and unloading station pursuant to claim 11, wherein the four-unit stack is configured to be supplied via chain conveyors in the seventh workstation to the stationary, pivoting rotary table with integrated chain conveyors, via which the four-unit stack is rotatable in the direction so as to be parallel to the loading cart.

13. Loading and unloading station pursuant to claim 12, wherein the rotary table is arranged to be brought about a vertical axis of rotation from the sixth workstation used to receive the four-unit stack to the eighth workstation rotated by an angle of 90° for forwarding to the loading cart, and
the rotary table is arranged to be guided over wheels on the floor.

14. Loading and unloading station pursuant to claim 13, wherein the four-unit stack in the eighth workstation is arranged to be lifted by the loading and unloading device of the loading cart and in the ninth workstation is arranged to be placed by chain conveyors into the railway car from which the load units have been removed.

* * * * *